(12) United States Patent
Lin

(10) Patent No.: US 9,110,640 B2
(45) Date of Patent: Aug. 18, 2015

(54) MEMORY COMBINATION AND COMPUTER SYSTEM USING THE SAME

(71) Applicants: Inventec (Pudong) Technology Corporation, Shanghai (CN); Inventec Corporation, Taipei (TW)

(72) Inventor: Yen-Cheng Lin, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 157 days.

(21) Appl. No.: 13/785,508

(22) Filed: Mar. 5, 2013

(65) Prior Publication Data

US 2014/0133081 A1 May 15, 2014

(30) Foreign Application Priority Data

Nov. 12, 2012 (CN) .......................... 2012 1 0448841

(51) Int. Cl.
*G06F 1/18* (2006.01)

(52) U.S. Cl.
CPC ................ *G06F 1/183* (2013.01); *G06F 1/184* (2013.01); *G06F 1/185* (2013.01)

(58) Field of Classification Search
CPC ........................................................ G06F 1/18
USPC .................. 361/679.31, 792, 679.01–679.45, 361/679.55–679.61, 724–747, 752–759, 361/796–802, 805–837; 312/223.2, 326, 312/323

See application file for complete search history.

(56) References Cited

U.S. PATENT DOCUMENTS

| | | | | |
|---|---|---|---|---|
| 5,259,516 A * | 11/1993 | Ellis | ........................... | 211/41.17 |
| 5,450,285 A * | 9/1995 | Schlemmer | ................... | 361/724 |
| 5,610,798 A * | 3/1997 | Lochridge | .................. | 361/679.6 |
| 5,896,273 A * | 4/1999 | Varghese et al. | ............... | 361/724 |
| 6,095,574 A * | 8/2000 | Dean | ............................. | 292/164 |
| 6,158,105 A * | 12/2000 | Suh | ................. | 29/453 |
| 6,297,948 B1 * | 10/2001 | Buican et al. | ............ | 361/679.58 |
| 6,356,436 B1 * | 3/2002 | Buican et al. | ............ | 361/679.58 |
| 6,373,697 B1 * | 4/2002 | Lajara et al. | ............. | 361/679.48 |
| 6,396,685 B1 * | 5/2002 | Chien | ...................... | 361/679.41 |
| 6,407,912 B1 * | 6/2002 | Chen et al. | ............... | 361/679.58 |
| 6,462,940 B1 * | 10/2002 | Diaz et al. | ................ | 361/679.37 |
| 6,542,356 B2 * | 4/2003 | Gan | ......................... | 361/679.58 |
| 6,628,512 B2 * | 9/2003 | Searby et al. | ............ | 361/679.58 |
| 6,721,183 B1 * | 4/2004 | Chen et al. | ..................... | 361/726 |
| 6,798,650 B2 * | 9/2004 | Reznikov et al. | ......... | 361/679.33 |
| 6,954,354 B2 * | 10/2005 | Shyr | ......................... | 361/679.33 |
| 7,095,609 B2 * | 8/2006 | Erickson et al. | ......... | 361/679.59 |
| 7,172,441 B2 * | 2/2007 | Schlack | ........................ | 439/152 |

(Continued)

*Primary Examiner* — Courtney Smith
*Assistant Examiner* — Rashen E Morrison
(74) *Attorney, Agent, or Firm* — Huffman Law Group, PC

(57) ABSTRACT

A memory combination includes a first riser board, a second riser board, a pivotal plate, a first engaging member, and a second engaging member. The first riser board has a first edge and a second edge parallel to each other. The second riser board has a third edge and a fourth edge parallel to each other. The pivotal plate are pivotally connected to the first riser board to be adjacent to the first edge and to the second riser board to be adjacent to the third edge. The first and second engaging members are respectively disposed on the first and second riser boards to be respectively adjacent to the second and fourth edges. When the first and second riser boards rotate to be perpendicular to the pivotal plate, the first engaging member is engaged with the second engaging member.

8 Claims, 6 Drawing Sheets

(56) References Cited

U.S. PATENT DOCUMENTS

| | | | |
|---|---|---|---|
| 7,193,855 B2* | 3/2007 | Fan et al. | 361/724 |
| 7,253,359 B2* | 8/2007 | Chen et al. | 174/50 |
| 7,312,397 B1* | 12/2007 | Chen | 174/66 |
| 7,315,457 B1* | 1/2008 | Chen | 361/801 |
| 7,345,886 B2* | 3/2008 | Bliven et al. | 361/727 |
| 7,486,510 B2* | 2/2009 | Han et al. | 361/679.33 |
| 7,551,434 B2* | 6/2009 | Zhu et al. | 361/679.33 |
| 7,643,287 B2* | 1/2010 | Sung et al. | 361/679.58 |
| 7,697,278 B2* | 4/2010 | Peng et al. | 361/679.35 |
| 7,753,325 B2* | 7/2010 | Lin et al. | 248/222.11 |
| 7,755,886 B2* | 7/2010 | Peng et al. | 361/679.33 |
| 7,766,434 B2* | 8/2010 | Cheng et al. | 312/223.2 |
| 7,826,213 B2* | 11/2010 | Peng et al. | 361/679.46 |
| 7,841,565 B2* | 11/2010 | Peng et al. | 248/27.1 |
| 7,848,086 B1* | 12/2010 | Chen | 361/679.01 |
| 7,894,210 B1* | 2/2011 | Searby | 361/802 |
| 7,901,241 B1* | 3/2011 | Larkin | 439/501 |
| 8,118,377 B2* | 2/2012 | Chen et al. | 312/223.2 |
| 8,253,015 B2* | 8/2012 | Chang | 174/50 |
| 8,292,377 B2* | 10/2012 | Ye | 312/223.2 |
| 8,310,827 B2* | 11/2012 | Huang et al. | 361/679.37 |
| 8,405,980 B2* | 3/2013 | Hsu et al. | 361/679.58 |
| 8,419,082 B2* | 4/2013 | Wu et al. | 292/116 |
| 8,534,628 B2* | 9/2013 | Lu | 248/309.1 |
| 8,632,140 B2* | 1/2014 | Chen et al. | 312/223.2 |
| 2004/0201336 A1* | 10/2004 | Chen | 312/265.6 |
| 2005/0213299 A1* | 9/2005 | Hardt et al. | 361/684 |
| 2006/0132006 A1* | 6/2006 | Schluter et al. | 312/323 |
| 2007/0035920 A1* | 2/2007 | Peng et al. | 361/685 |
| 2007/0210684 A1* | 9/2007 | Lin et al. | 312/223.2 |
| 2008/0112142 A1* | 5/2008 | RaghuRam et al. | 361/736 |
| 2009/0057524 A1* | 3/2009 | Chen | 248/638 |
| 2009/0080164 A1* | 3/2009 | Purcell et al. | 361/737 |
| 2009/0120264 A1* | 5/2009 | Wheeler et al. | 84/174 |
| 2010/0244639 A1* | 9/2010 | Chen et al. | 312/223.2 |
| 2012/0013233 A1* | 1/2012 | Chen et al. | 312/327 |
| 2013/0146596 A1* | 6/2013 | Chen et al. | 220/262 |
| 2014/0001940 A1* | 1/2014 | Chang et al. | 312/326 |
| 2014/0027145 A1* | 1/2014 | Gong | 174/66 |
| 2014/0218845 A1* | 8/2014 | Peng et al. | 361/679.01 |

* cited by examiner

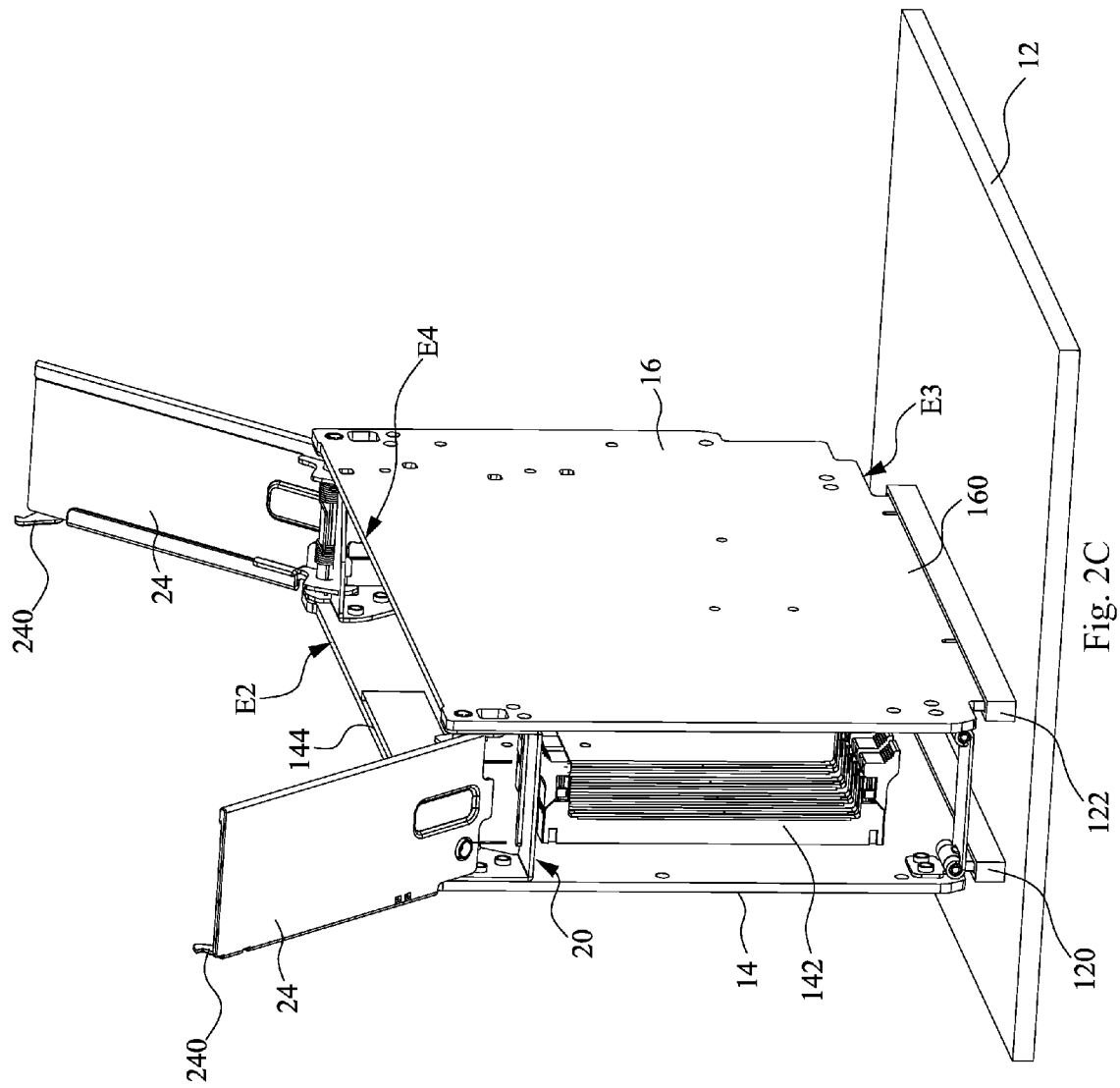

MEMORY COMBINATION AND COMPUTER SYSTEM USING THE SAME

RELATED APPLICATIONS

This application claims priority to China Application Serial Number 201210448841.X, filed Nov. 12, 2012, which is herein incorporated by reference.

BACKGROUND

1. Field of Invention

The invention relates to a memory combination and a computer system using the same.

2. Description of Related Art

In existing computer systems, most memory modules, such as Dual In-line Memory Modules (DIMMs), are directly plugged into memory sockets of a motherboard. However, in order to use more memory modules in a server, a riser board is used to increase the number of the memory modules. In all of the current approaches, a plurality of memory modules are plugged into a single riser board to form one memory combination. Then, the whole memory combination is plugged into a riser slot on the motherboard. One control chip is disposed on the riser board for controlling reading data from and writing data to various memory modules on the riser board.

However, currently, all the techniques for plugging a plurality of riser boards into the motherboard enable the memory modules on each riser board to face towards the same direction and enable the riser boards to be arranged closely. Nonetheless, it is inevitable that the control chip disposed on the riser board occupies a portion of the space on the riser board, and the memory sockets cannot be disposed in the occupied space. Accordingly, this leads to the space between the two riser boards corresponding to the control chip being idle, without being used effectively. Therefore, in the case that the height and space of the server are limited, how to place more memory modules in the limited space of the server is a challenge to those in the art.

SUMMARY

The invention provides a memory combination including a first riser board, a second riser board, a pivotal plate, a first engaging member, and a second engaging member. The first riser board has a first edge and a second edge parallel to each other. The second riser board has a third edge and a fourth edge parallel to each other. Two ends of the pivotal plate are pivotally connected to the first riser board to be adjacent to the first edge and to the second riser board to be adjacent to the third edge, respectively. The first engaging member is disposed on the first riser board to be adjacent to the second edge. The second engaging member is disposed on the second riser board to be adjacent to the fourth edge. When the first and second riser boards rotate relative to the pivotal plate to be perpendicular to the pivotal plate, the first engaging member is engaged with the second engaging member.

In an embodiment of the invention, the above-mentioned memory combination further includes a handle. One end of the handle is pivotally connected to the first engaging member so that the other end of the handle can be moved optionally towards or away from the second edge and the fourth edge.

In an embodiment of the invention, the above-mentioned handle includes a hook. The first riser board further includes a fastener. The fastener is disposed on the first riser board to be adjacent to the second edge for being engaged with the hook.

In an embodiment of the invention, the above-mentioned first engaging member has a connection portion, a first bending portion, and a second bending portion. The first bending portion and the second bending portion are respectively connected to two ends of the connection portion and are bent relative to the connection portion. The first bending portion is fixed onto the first riser board to be adjacent to the second edge. When the first riser board and the second riser board are perpendicular to the pivotal plate, the second bending portion is abutted against the second riser board.

In an embodiment of the invention, the above-mentioned second bending portion has an opening for being partly passed through by the second engaging member and engaged with the second engaging member.

The invention further provides a computer system including a motherboard, a first riser board, a second riser board, a pivotal plate, a first engaging member, and a second engaging member. The motherboard includes a first riser slot and a second riser slot disposed side by side. The first riser board is plugged into the first riser slot and has a first edge and a second edge parallel to each other. The second riser board is plugged into the second riser slot and has a third edge and a fourth edge parallel to each other. Two ends of the pivotal plate are pivotally connected to the first riser board to be adjacent to the first edge and to the second riser board to be adjacent to the third edge respectively. The first engaging member is disposed on the first riser board to be adjacent to the second edge. The second engaging member is disposed on the second riser board to be adjacent to the fourth edge. When the first and second riser boards rotate relative to the pivotal plate to be perpendicular to the pivotal plate, the first engaging member is engaged with the second engaging member.

In view of the above, an essential feature of the memory combination and computer system of the invention is that one side of the two riser boards is pivotally connected through a pivotal plate so that the two riser boards can be unfolded and covered with each other like books while another side of the two riser boards is engaged with each other through two engaging members so as to maintain a distance between the two riser boards. Another essential feature of the memory combination and computer system of the invention is that an accommodable handle is pivotally connected to the engaging member. Accordingly, users can hold the handle conveniently so as to easily plug the memory combination in or out from the riser slot of the motherboard. Still another essential feature of the memory combination and computer system of the invention is that a plurality of memory sockets are disposed on each of the two riser boards. The memory sockets on the two riser boards are unaligned with each other in the form of groups. Accordingly, the memory combination of the invention can have more memory sockets to plug memory modules.

BRIEF DESCRIPTION OF THE DRAWINGS

FIG. 2C is another perspective view illustrating FIG. 2B, wherein the handle is unfolded relative to the first riser board and the second riser board;

DETAILED DESCRIPTION

Figure 1:
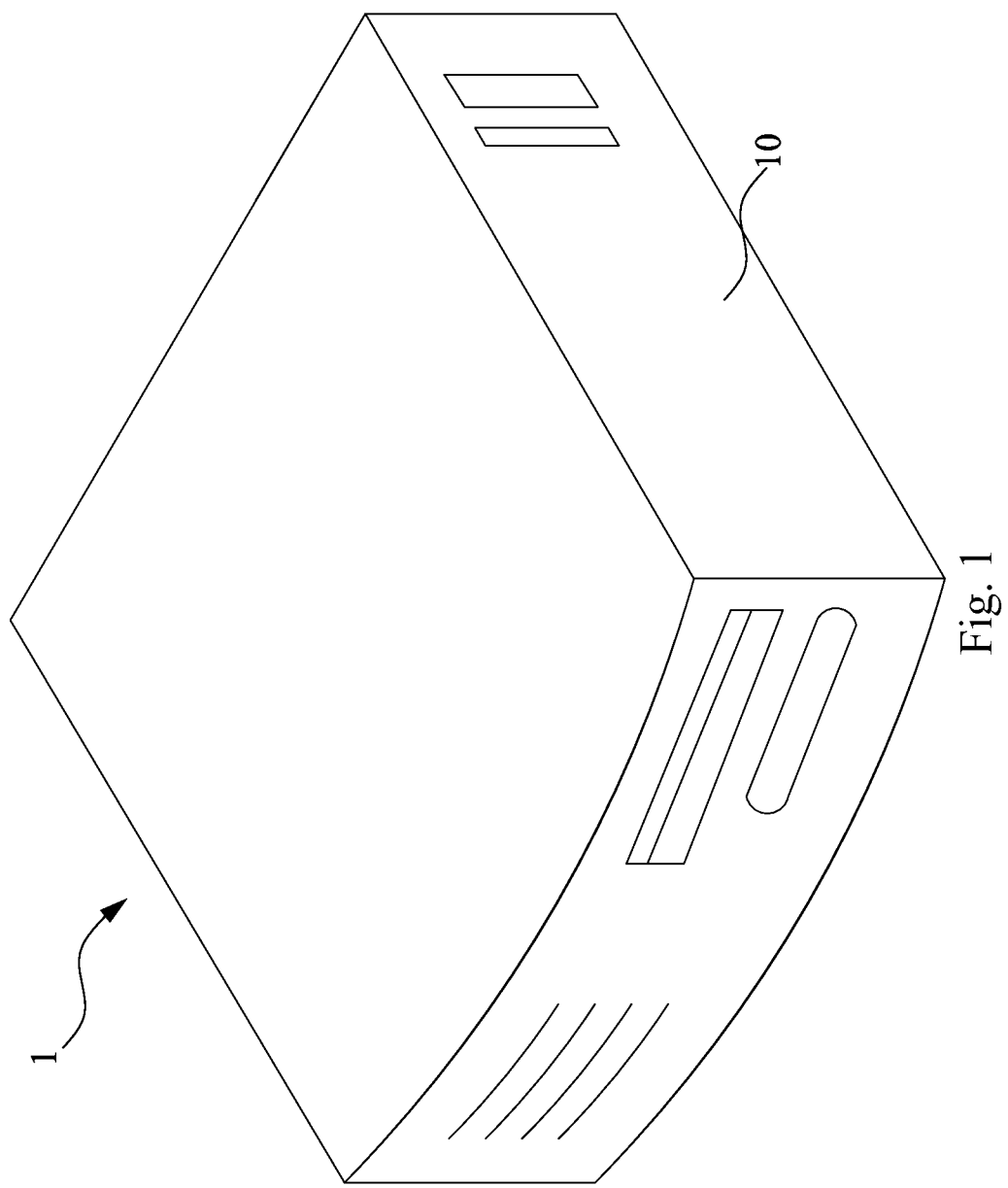
FIG. 1 is a perspective view illustrating a computer system according to an embodiment of the invention.

A plurality of embodiments of the invention will be disclosed hereinafter with reference to drawings. For purposes of clear illustration, many details in practice will be described together in the following disclosure. However, it should be understood that these details in practice are not intended to limit the invention. That is, for some embodiments of the invention, these details are unnecessary in practice. Additionally, for purpose of simplifying drawings, some conventional structures and elements in the drawings will be illustrated schematically.

FIG. 1 illustrates a perspective view of a computer system 1 according to an embodiment of the invention.

In FIG. 1, the computer system 1 of this embodiment is exemplified as a server, although the invention is not limited to such a device. For any computer system 1, as long as it is required to plug many memory modules into the motherboard in the computer system 1, the concept of the memory combination of the invention can be applied to improve the space utilization in a housing 10 of the computer system 1 effectively.

Figure 2A:
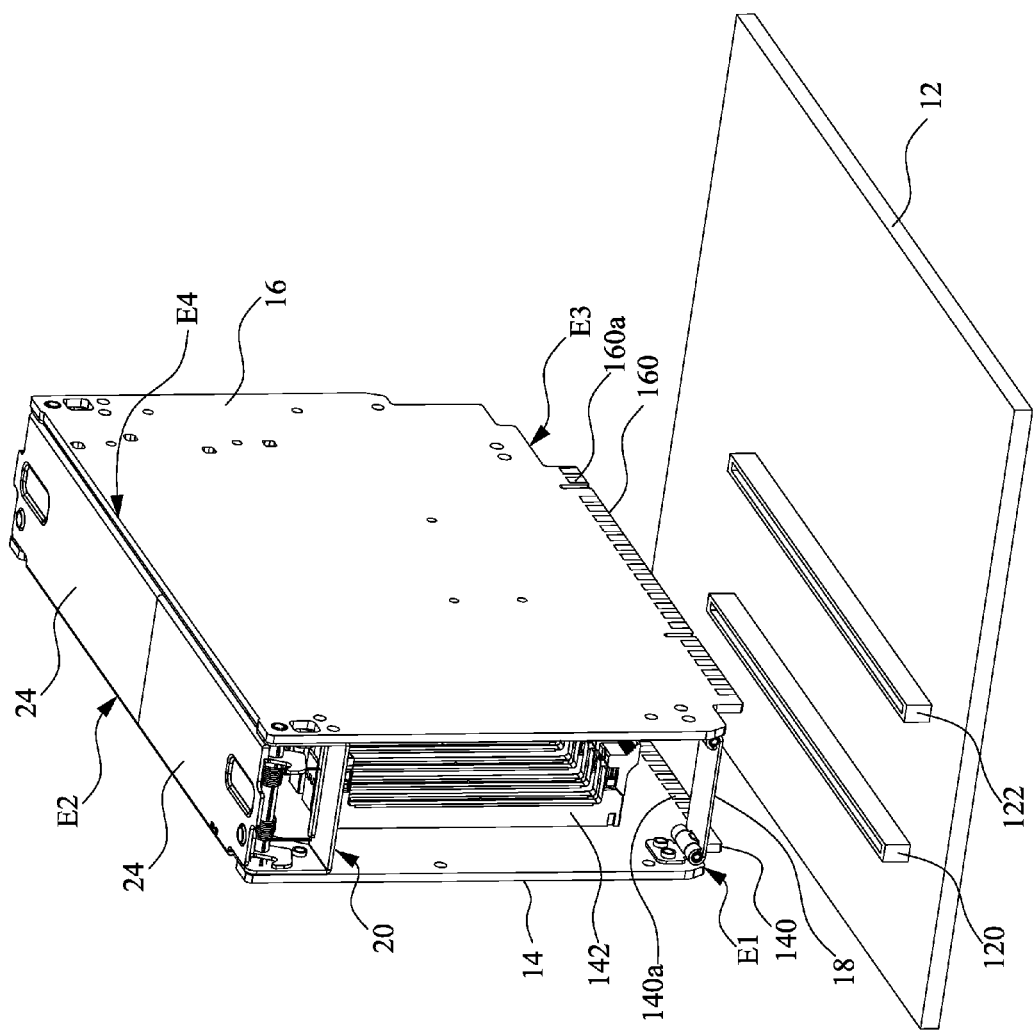
FIG. 2A is a perspective view illustrating a memory combination before being plugged into the motherboard in the computer system in FIG. 1 according to an embodiment of the invention.
Figure 2B:
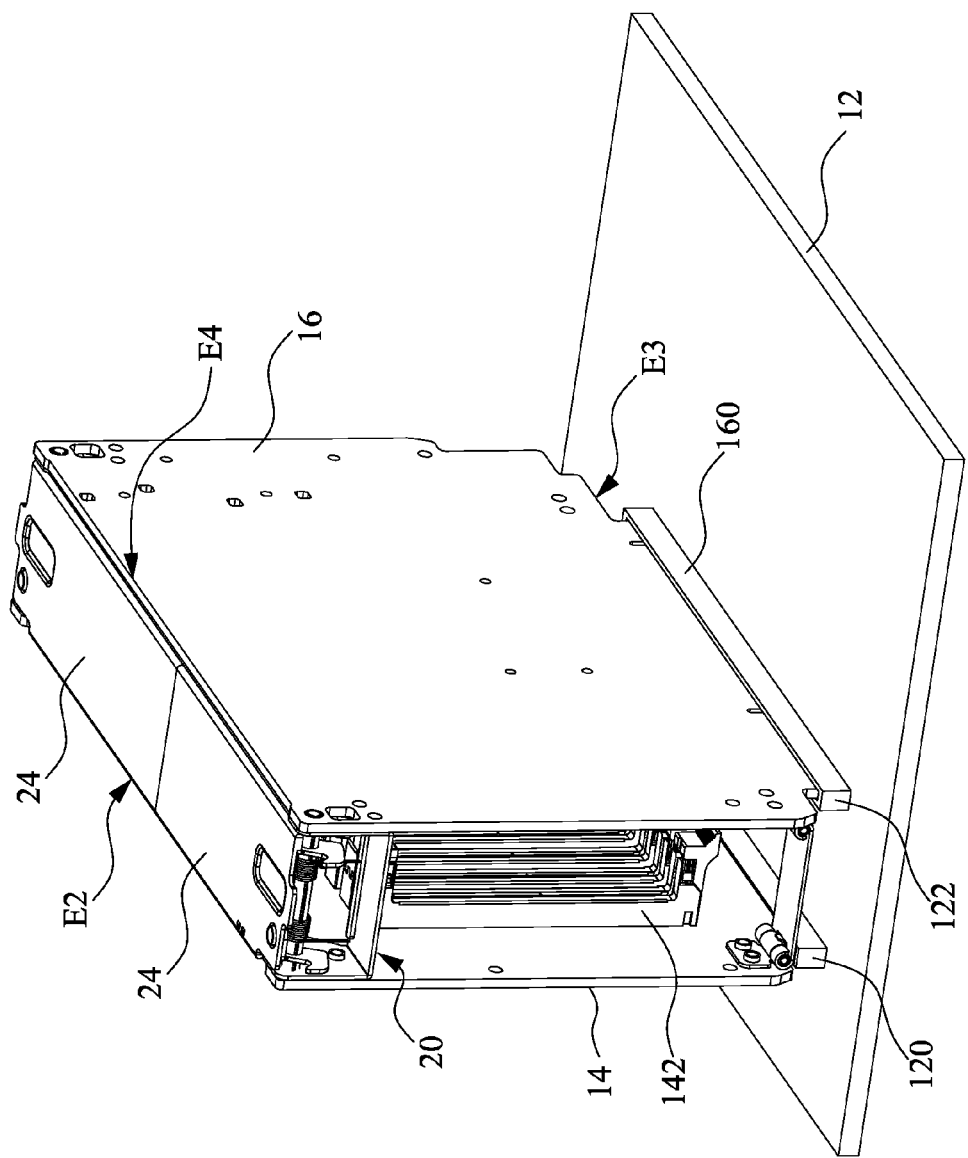
FIG. 2B is a perspective view illustrating the memory combination in FIG. 2A after being plugged into the motherboard.
Figure 3:
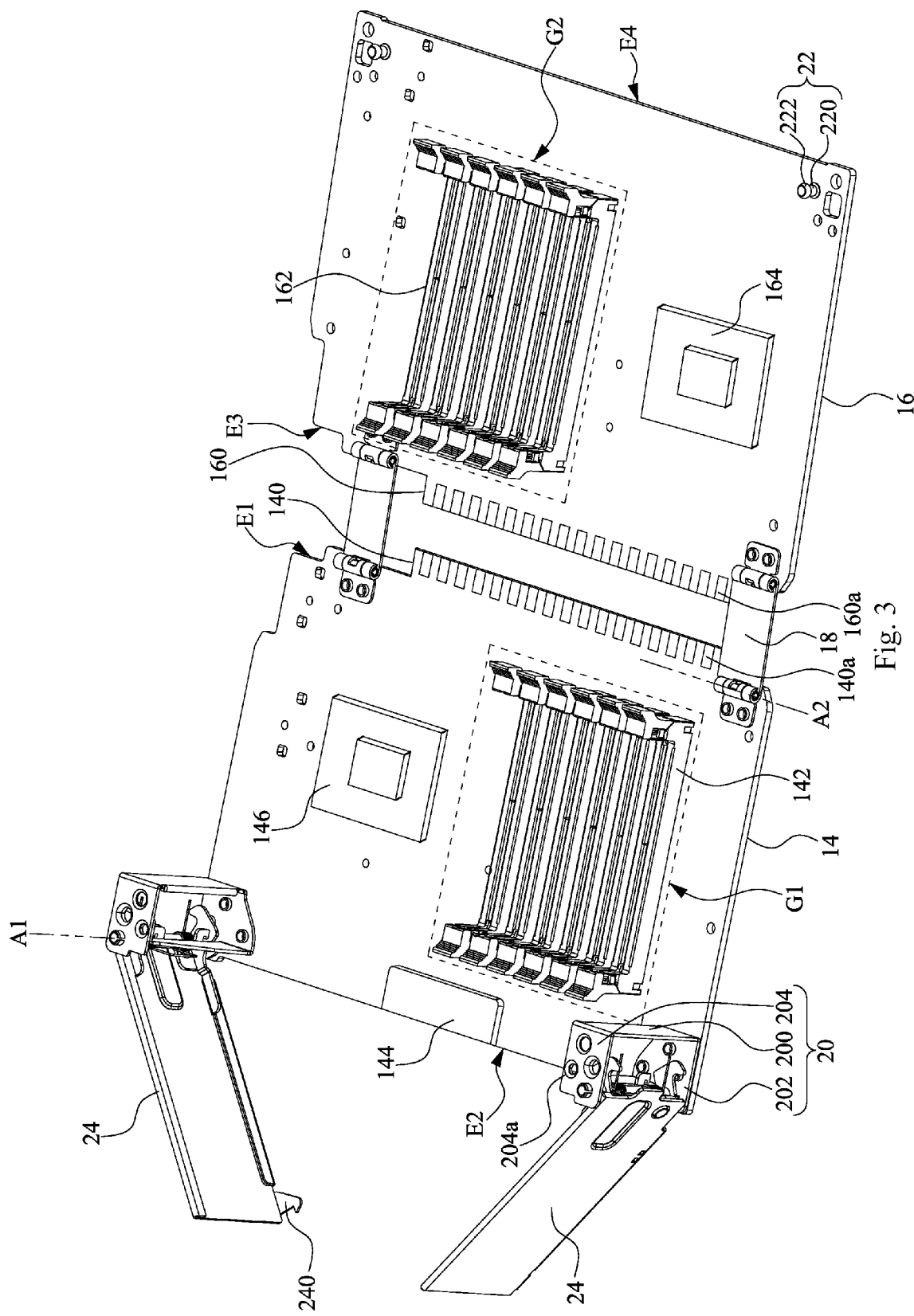
FIG. 3 is an unfolded view illustrating the memory combination in FIG. 2C.

FIG. 2A is a perspective view illustrating a memory combination before being plugged into a motherboard 12 in the computer system 1 of FIG. 1 according to an embodiment of the invention. FIG. 2B is a perspective view illustrating the memory combination in FIG. 2A after being plugged into the motherboard 12. FIG. 2C is another perspective view illustrating FIG. 2B, wherein a handle 24 is unfolded relative to a first riser board 14 and a second riser board 16. FIG. 3 is an unfolded diagram illustrating the memory combination in FIG. 2C. It should be illustrated that, in order to present the structures of the first riser board 14 and the second riser board 16 clearly, a memory module 26 is omitted in FIGS. 2A-3 but illustrated in FIG. 4.

As shown in FIGS. 2A-2C, in this embodiment, the motherboard 12 of the computer system 1 is disposed in the housing 10. The motherboard 12 at least includes a first riser slot 120 and a second riser slot 122 disposed side by side. That is, in this embodiment, the first riser slot 120 and the second riser slot 122 of the motherboard 12 are parallel and closely adjacent to each other.

However, the motherboard 12 may include more than one group of the first riser slots 120 and the second riser slots 122 thereon. In actual applications, the group number of the first riser slots 120 and the second riser slots 122 included on the motherboard 12 can be flexibly increased or decreased according to the actual demand.

As shown in FIG. 3, in this embodiment, the memory combination includes a first riser board 14, a second riser board 16, a pivotal plate 18, a first engaging member 20 and a second engaging member 22. The first riser board 14 of the memory combination has a first edge E1 and a second edge E2 parallel to each other. The first riser board 14 includes a first connection port 140 extended from the first edge E1, through which the first riser board 14 is plugged into the first riser slot 120 of the motherboard 12. The first connection port 140 of the first riser board 14 has a metal terminal 140*a* thereon. After the first riser board 14 is plugged into the first riser slot 120 of the motherboard 12 through the first connection port 140, the metal terminal 140*a* is electrically connected to the first riser slot 120. The second riser board 16 of the memory combination has a third edge E3 and a fourth edge E4 parallel to each other. The second riser board 16 includes a second connection port 160 extended from the third edge E3, through which the second riser board 16 can be plugged into the second riser slot 122 of the motherboard 12. The second connection port 160 of the second riser board 16 has a metal terminal 160*a* thereon. After the second riser board 16 is plugged into the second riser slot 122 of the motherboard 12 through the second connection port 160, the metal terminal 160*a* is electrically connected to the second riser slot 122.

Two ends of the pivotal plate 18 of the memory combination are pivotally connected to the first riser board 14 to be adjacent to the first edge E1 and to the second riser board 16 to be adjacent to the third edge E3 respectively. In this way, the first riser board 14 and the second riser board 16 can rotate relative to the pivotal plate 18, presenting the status of being unfolded and covered with each other like books.

As shown in FIG. 3, in this embodiment, the first engaging member 20 of the memory combination is disposed on the first riser board 14 to be adjacent to the second edge E2. The second engaging member 22 of the memory combination is disposed on the second riser board 16 to be adjacent to the fourth edge E4. When the first riser board 14 and the second riser board 16 rotate relative to the pivotal plate 18 to be perpendicular to the pivotal plate 18, the first engaging member 20 is engaged with the second engaging member 22.

Furthermore, in this embodiment, the first engaging member 20 of the memory combination has a connection portion 200, a first bending portion 202 and a second bending portion 204. The first bending portion 202 and the second bending portion 204 of the first engaging member 20 are respectively connected to two ends of the connection portion 200 and are bent towards the same direction relative to the connection portion 200. Accordingly, the profile of the first engaging member 20 is substantially presented as a U shape, although the invention is not limited to this. The first bending portion 202 of the first engaging member 20 is fixed onto the first riser board 14 to be adjacent to the second edge E2. The second bending portion 204 of the first engaging member 20 has an opening 204*a*.

Additionally, in this embodiment, the second engaging member 22 of the memory combination is a bump and the second engaging member 22 has a neck 220 and a head 222. The neck 220 of the second engaging member 22 is connected to the head 222 and the head 222 has a size greater than that of the neck 220. The head 222 of the second engaging member 22 has a size greater than that of the opening 204*a* of the second bending portion 204, and the neck 220 of the second engaging member 22 has a size equal to or smaller than that of the opening 204*a* of the second bending portion 204. In this embodiment, the second engaging member 22 can be manufactured from a compressible and elastic material.

According to the above-mentioned structure configuration, when the first riser board 14 and the second riser board 16 rotate relative to the pivotal plate 18 to be perpendicular to the pivotal plate 18, the head 222 of the second engaging member 22 passes through the opening 204*a* by being extruded towards the opening 204*a*, so that the opening 204*a* is engaged with the neck 220 of the second engaging member 22. Thus, the second bending portion 204 of the first engaging member 20 is abutted against the second riser board 16. Accordingly, the first engaging member 20 and the second engaging member 22 of the memory combination are engaged with each other.

It can be seen that when the first riser board 14 and the second riser board 16 rotate relative to the pivotal plate 18 to be perpendicular to the pivotal plate 18, the pivotal plate 18 of the memory combination maintains a distance between the first edge E1 of the first riser board 14 and the third edge E3 of the second riser board 16 while the first engaging member 20 maintains a distance between the second edge E2 of the first riser board 14 and the fourth edge E4 of the second riser board 16. In other words, the space between the first riser board 14 and the second riser board 16 is maintained by the pivotal plate 18 and the first engaging member 20.

In another embodiment, the first engaging member 20 also may be disposed on the second riser board 16 and the second engaging member 22 may be disposed on the first riser board 14 so as to achieve the same purpose of maintaining the distance between the second edge E2 of the first riser board 14 and the fourth edge E4 of the second riser board 16.

As shown in FIG. 3, in this embodiment, the memory combination further includes a handle 24. One end of the handle 24 is pivotally connected to the first engaging member 20 (in particular, being pivotally connected between the first bending portion 202 and the second bending portion 204 of the first engaging member 20) so that the other end of the handle 24 can be moved optionally towards or away from the second edge E2 of the first riser board 14 and the fourth edge E4 of the second riser board 16.

Furthermore, the handle 24 of the memory combination includes a hook 240. The first riser board 14 further includes a fastener 144. The fastener 144 of the first riser board 14 is disposed on the first riser board 14 to be adjacent to the second edge E2 for being engaged with the hook 240. Additionally, in this embodiment, the profile of the handle 24 is presented as a sheet shape. When the first riser board 14 and the second riser board 16 are perpendicular to the pivotal plate 18 and the handle 24 rotates relative to the first engaging member 20 to enable the hook 240 to be engaged with the fastener 144, the handle 24 is aligned with the second edge E2 of the first riser board 14 and the fourth edge E4 of the second riser board 16.

Furthermore, when the hook 240 is engaged with the fastener 144, the handle 24 is covered on the same side of the first riser board 14 and the second riser board 16 so as to further prevent the extraneous material from entering the space between the first riser board 14 and the second riser board 16 through the position between the second edge E2 of the first riser board 14 and the fourth edge E4 of the second riser board 16.

By doing so, users can hold the handle 24 conveniently to easily plug the memory combination in or out from the first riser slot 120 and the second riser slot 122 of the motherboard 12 or perform other actions to the memory combination with respect to the first riser slot 120 and the second riser slot 122 of the motherboard 12. Users also can cover the handle 24 onto the same side of the first riser board 14 and the second riser board 16 so as to achieve the function of preventing the extraneous material from entering the space between the first riser board 14 and the second riser board 16.

As shown in FIG. 3, in this embodiment, an axial direction A1 in which the handle 24 of the memory combination is pivotally connected to the first engaging member 20 is perpendicular to the first riser board 14 and is perpendicular to an axial direction A2 in which the pivotal plate 18 is pivotally connected to the first riser board 14, although the invention is not limited to this.

In another embodiment, the fastener 144 of the first riser board 14 also may be disposed on the second riser board 16 to be adjacent to the fourth edge E4 and the position of the hook 240 on the handle 24 may be adjusted to achieve the same purpose of engaging the hook 240 with the fastener 144.

As shown in FIG. 3, in this embodiment, the first riser board 14 includes a plurality of first memory sockets 142. The second riser board 16 includes a plurality of second memory sockets 162. When the first riser board 14 and the second riser board 16 are plugged onto the motherboard 12, the first memory sockets 142 on the first riser board 14 face the second riser board 16 and the second memory sockets 162 on the second riser board 16 face the first riser board 14.

In other words, in this embodiment, when the first riser board 14 and the second riser board 16 are plugged onto the motherboard 12, the first memory sockets 142 on the first riser board 14 and the second memory sockets 162 on the second riser board 16 are disposed at an opposite position. The first memory sockets 142 on the first riser board 14 and the second memory sockets 162 on the second riser board 16 are all available to plug the memory module 26 (referring to FIG. 4). For example, the memory module 26 may be a Dual In-line Memory Module (DIMM), although the invention is not limited to this. The portion of the memory module 26 plugged into the first memory sockets 142 or the second memory sockets 162 has metal terminals (not shown) so as to electrically connect the memory module 26 to the first memory sockets 142 or the second memory sockets 162.

It should be noted that, in order to place more memory modules 26 in the limited space of the computer system 1, the first memory sockets 142 on the first riser board 14 and the second memory sockets 162 on the second riser board 16 are unaligned with each other in the invention.

Figure 4:
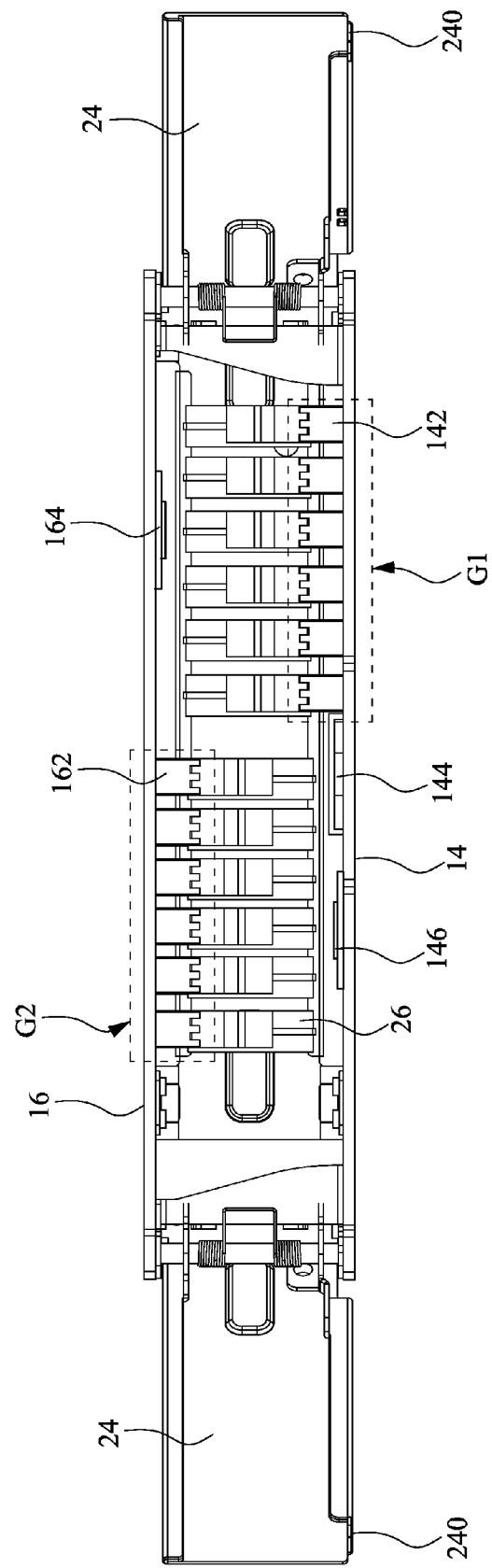
FIG. 4 is a top view illustrating the memory combination in FIG. 2C.

Referring to FIG. 4, it illustrates a top view of the memory combination in FIG. 2C.

As shown in FIGS. 3 and 4, in this embodiment, the first riser board 14 further includes a first control chip 146. The first control chip 146 of the first riser board 14 is electrically connected to the first memory sockets 142 so as to control and process the data exchange between the memory modules 26 plugged into the first memory sockets 142 and the motherboard 12. The second riser board 16 further includes a second control chip 164. The second control chip 164 of the second riser board 16 is electrically connected to the second memory sockets 162 so as to control and process the data exchange between the memory modules 26 plugged into the second memory sockets 162 and the motherboard 12.

The first memory sockets 142 on the first riser board 14 are closely arranged to form a first memory socket group G1. The second memory sockets 162 on the second riser board 16 are closely arranged to form a second memory socket group G2. Furthermore, when the first riser board 14 and the second riser board 16 are perpendicular to the pivotal plate 18, the region of the first memory socket group G1 is aligned with the region of the second control chip 164, and the region of the second memory socket group G2 is aligned with the region of the first control chip 146.

Accordingly, although the first memory sockets 142 cannot be disposed in the region 14 on the first riser board 14 where the first control chip 146 is disposed, the memory modules 26 plugged into the second memory socket group G2 extend towards the first control chip 146. Therefore, the space on the first riser board 14 which is occupied by the first control chip 146 just can be used to place the memory modules 26 plugged into the second memory socket group G2 effectively. Similarly, although the second memory sockets 162 cannot be disposed in the region on the second riser board 16 where the second control chip 164 is disposed, the memory modules 26 plugged into the first memory socket group G1 extend towards the second control chip 164. Therefore, the space on the second riser board 16 which is occupied by the second control chip 164 just can be used to place the memory modules 26 plugged into the first memory socket group G1 effectively.

Through the above-mentioned arrangement manner, when the first riser board 14 and the second riser board 16 are perpendicular to the pivotal plate 18, and all the first memory sockets 142 and the second memory sockets 162 are filled full of the memory modules 26, the memory modules 26 between the first riser board 14 and the second riser board 16 can be unaligned with each other and arranged more closely so as to further use the space between the first riser board 14 and the second riser board 16 effectively.

Additionally, in this embodiment, when the first riser board 14 and the second riser board 16 are plugged onto the motherboard 12, the arrangement direction of the first memory sockets 142 on the first riser board 14 is parallel to the motherboard 12 while the arrangement direction of the second memory sockets 162 on the second riser board 16 is also parallel to the motherboard 12 (referring to FIGS. 2A-3).

However, the arrangement direction of the first memory sockets 142 on the first riser board 14 and the arrangement direction of the second memory sockets 162 on the second riser board 16 are not limited to the direction parallel to the motherboard 12. In another embodiment, the arrangement direction of the first memory sockets 142 on the first riser board 14 may be optionally perpendicular or parallel to the motherboard 12 while the arrangement direction of the second memory sockets 162 on the second riser board 16 also may be optionally perpendicular or parallel to the motherboard 12.

In other words, as long as on the first riser board 14 the first memory socket group G1 is unaligned with the second memory socket group G2 and on the second riser board 16 the second memory socket group G2 is unaligned with the first memory socket group G1, the memory combination of the invention can use the space between the first riser board 14 and the second riser board 16 effectively.

From the above detailed description of the specific embodiments of the invention, it can be seen obviously that an essential feature of the memory combination and computer system of the invention is that one side of the two riser boards is pivotally connected through the pivotal plate so that the two riser boards can be unfolded and covered with each other like books while another side of the two riser boards is engaged with each other through two engaging members so as to maintain a distance between the two riser boards. Another essential feature of the memory combination and computer system of the invention is that an accommdable handle is pivotally connected to the engaging member. Accordingly, users can hold the handle conveniently so as to easily plug the memory combination in or out from the riser slot of the motherboard. Still another essential feature of the memory combination and computer system of the invention is that a plurality of memory sockets are disposed on each of the two riser boards, and the memory sockets on the two riser boards are unaligned with each other in the form of groups. Thus, the memory combination of the invention can have more memory sockets to plug memory modules.

Although the invention has been disclosed through the above embodiments, these embodiments are not intended to limit the invention. Those of skills in the art can make various variations and modifications without departing from the spirit and scope of the invention. Therefore, the scope of the invention should be defined by the appended claims.

What is claimed is:

1. A memory combination comprising:
   a first riser board having a first edge and a second edge parallel to each other;
   a second riser board having a third edge and a fourth edge parallel to each other;
   a pivotal plate, wherein two ends of the pivotal plate are pivotally connected to the first riser board to be adjacent to the first edge and to the second riser board to be adjacent to the third edge, respectively;
   a first engaging member disposed on the first riser board to be adjacent to the second edge;
   a second engaging member disposed on the second riser board to be adjacent to the fourth edge; and
   a handle, wherein one end of the handle is pivotally connected to the first engaging member so that the other end of the handle can be moved optionally towards or away from the second edge and the fourth edge,
   wherein when the first and second riser boards rotate relative to the pivotal plate to be perpendicular to the pivotal plate, and wherein the first engaging member is engaged with the second engaging member.

2. The memory combination of claim 1, wherein the handle comprises a hook and the first riser board further comprises a fastener which is disposed on the first riser board to be adjacent to the second edge so as to engage with the hook.

3. The memory combination of claim 2, wherein the first engaging member has a connection portion, a first bending portion, and a second bending portion, wherein the first bending portion and the second bending portion are connected to two ends of the connection portion, respectively, and are bent relative to the connection portion, and wherein the first bending portion is fixed on the first riser board to be adjacent to the second edge, and when the first riser board and the second riser board are perpendicular to the pivotal plate, the second bending portion is abutted against the second riser board.

4. The memory combination of claim 3, wherein the second bending portion has an opening for being partly passed through by the second engaging member and being engaged with the second engaging member.

5. A computer system comprising:
   a motherboard comprising a first riser slot and a second riser slot disposed side by side;
   a first riser board plugged into the first riser slot and having a first edge and a second edge parallel to each other;
   a second riser board plugged into the second riser slot and having a third edge and a fourth edge parallel to each other;
   a pivotal plate, wherein two ends of the pivotal plate are pivotally connected to the first riser board to be adjacent to the first edge and to the second riser board to be adjacent to the third edge, respectively;
   a first engaging member disposed on the first riser board to be adjacent to the second edge;
   a second engaging member disposed on the second riser board to be adjacent to the fourth edge; and
   a handle, wherein one end of the handle is pivotally connected to the first engaging member so that the other end of the handle can be moved optionally towards or away from the second edge and the fourth edge,
   wherein when the first and second riser boards rotate relative to the pivotal plate to be perpendicular to the pivotal plate, and wherein the first engaging member is engaged with the second engaging member.

6. The computer system of claim 5, wherein the handle comprises a hook and the first riser board further comprises a fastener which is disposed on the first riser board to be adjacent to the second edge so as to be engaged with the hook.

7. The computer system of claim 5, wherein the first engaging member has a connection portion, a first bending portion, and a second bending portion, and wherein the first bending portion and the second bending portion are connected to two ends of the connection portion, respectively, and are bent relative to the connection portion, and wherein the first bending portion is fixed on the first riser board to be adjacent to the second edge and when the first riser board and the second riser board are perpendicular to the pivotal plate, the second bending portion is abutted against the second riser board.

8. The computer system of claim 7, wherein the second bending portion has an opening for being partly passed through by the second engaging member and being engaged with the second engaging member.

* * * * *